US012412145B1

(12) United States Patent
Bhatia et al.

(10) Patent No.: US 12,412,145 B1
(45) Date of Patent: Sep. 9, 2025

(54) TRIGGERING A MITIGATION ACTION BASED ON AN ARTIFICIAL INTELLIGENCE MODEL-BASED DELIVERY DEFECT PREDICTION

(71) Applicant: Amazon Technologies, Inc., Seattle, WA (US)

(72) Inventors: Tarun Bhatia, Sunnyvale, CA (US); Karthik Ram Srinivasan, Bellevue, WA (US); Valerie Galluzzi Liptak, Mill Creek, WA (US); Amber Roy Chowdhury, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 17/695,042

(22) Filed: Mar. 15, 2022

(51) Int. Cl.
*G06Q 10/0833* (2023.01)
*G06N 5/04* (2023.01)

(52) U.S. Cl.
CPC .......... *G06Q 10/0833* (2013.01); *G06N 5/04* (2013.01)

(58) Field of Classification Search
CPC ............................. G06Q 10/0833; G06N 5/04
See application file for complete search history.

(56) References Cited

U.S. PATENT DOCUMENTS

| | | | | |
|---|---|---|---|---|
| 11,244,277 B1* | 2/2022 | Harms, Jr. | ......... | G06Q 10/0833 |
| 2015/0046361 A1* | 2/2015 | Williams | ............. | G06Q 10/083 705/330 |
| 2017/0154347 A1* | 6/2017 | Bateman | ................. | G06Q 40/08 |
| 2018/0121875 A1* | 5/2018 | Satyanarayana Rao | ...................... | G06Q 10/08355 |
| 2019/0130351 A1* | 5/2019 | Arena | ................. | G06Q 10/0833 |
| 2019/0333016 A1* | 10/2019 | Phillips | ............ | G06K 19/06037 |
| 2021/0216962 A1* | 7/2021 | Lawson | ............. | G06Q 10/0833 |
| 2022/0101248 A1* | 3/2022 | Grant | ................. | G06Q 10/0832 |

OTHER PUBLICATIONS

Shahid, S. (Dec. 16, 2020). Predicting delays in delivery process using machine learning-based approach. figshare. <https://hammer.purdue.edu/articles/thesis/Predicting_Delays_In_Delivery_Process_Using_Machine_Learning-Based_Approach/13350764> (Year: 2020).*

* cited by examiner

*Primary Examiner* — Shannon S Campbell
*Assistant Examiner* — Manal A. Alsamiri
(74) *Attorney, Agent, or Firm* — Kilpatrick Townsend & Stockton LLP

(57) ABSTRACT

Techniques for triggering a mitigation action based on an artificial intelligence (AI) model-based delivery defect prediction are described. In an example, a computer system determines contextual information associated with a stage of a delivery flow of an item to a delivery location. The computer system generates an input based at least in part on the contextual information and provides the input to an AI model trained to predict delivery defect information at delivery flow stages. The computer system determines, based at least in part on an output of the artificial intelligence model, a predicted delivery defect associated with the stage of the delivery flow. The computer system determining a mitigation action based at least in part on the predicted delivery defect and causing the mitigation action to be performed.

20 Claims, 10 Drawing Sheets

TRIGGERING A MITIGATION ACTION BASED ON AN ARTIFICIAL INTELLIGENCE MODEL-BASED DELIVERY DEFECT PREDICTION

BACKGROUND

Delivery of items to locations can be facilitated with the use of location information of devices. For example, a delivery driver may operate their mobile phone to receive, from a server, delivery location information and to send, to the server, their mobile phone's location information. If the mobile phone's location and the delivery location are within a distance threshold from each other, the server can send a notification to the mobile phone information the delivery driver that the delivery can be performed. As such, the accuracy of deliveries using location information can depend greatly on the accuracy of the location information.

BRIEF DESCRIPTION OF THE DRAWINGS

Various embodiments in accordance with the present disclosure will be described with reference to the drawings, in which.

DETAILED DESCRIPTION

Figure 1:
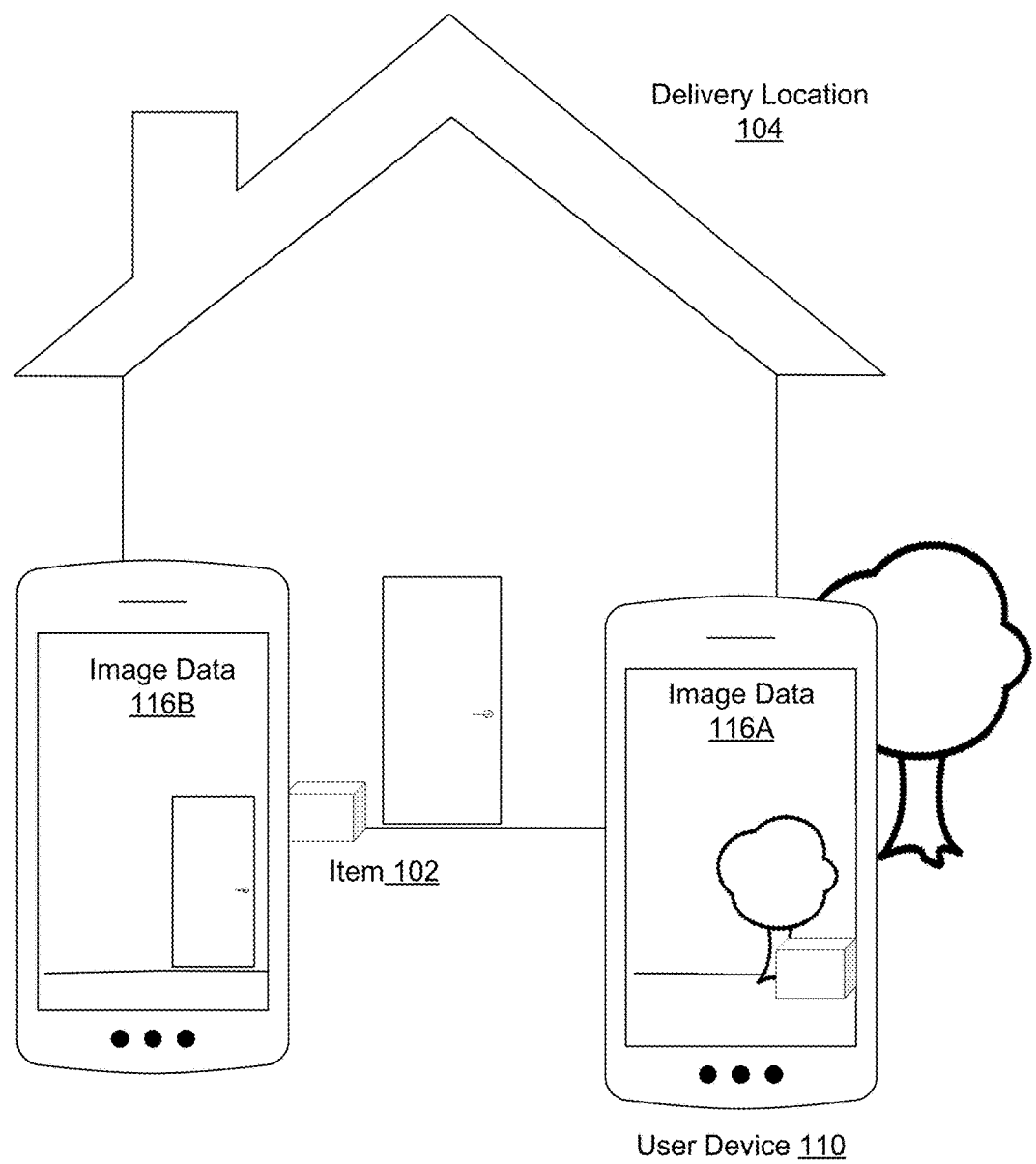
FIG. 1 illustrates an example of a system performing delivery defect prediction to trigger a mitigation action during a delivery stage of a delivery flow, according to embodiments of the present disclosure.
Figure 1:
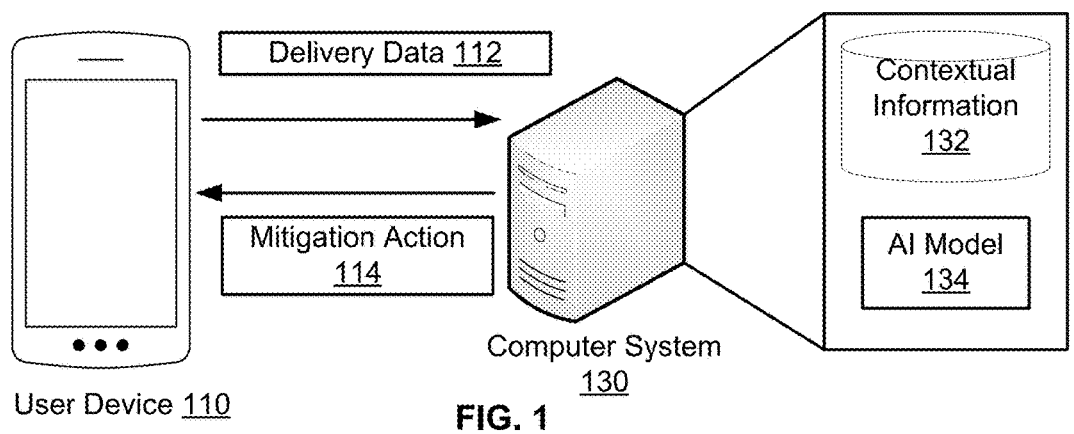

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for triggering a mitigation action based on an artificial intelligence (AI) model-based delivery defect prediction. In an example, a computer system, to an AI model, inputs contextual information associated with a stage of a delivery flow of an item to a delivery location. The contextual information can be updated at each stage of the delivery flow to include new information that was not available at previous stages. The AI model is trained to predict delivery defect information at delivery flow stages. As such, the computer system determines a predicted delivery defect associated with the stage of the delivery flow based on an output of the AI model. The computer system may additionally determine a contributing factor to the predicted delivery defect based on the contextual information for the stage of the delivery flow. Based on the predicted delivery defect, the computer system determines a mitigation action. For example, the mitigation action may involve allocating the delivery of the item to a particular user account, providing a notification to a user device of a user associated with performing the delivery, or indicating that a picture of the item delivery is to be sent to a computing device of a customer associated with the delivery location. The computer system may send mitigation action data indicating the mitigation action to the user device.

To illustrate, consider an example of a delivery driver delivering an item to a delivery location. At each stage of a delivery flow, including an order stage, a fulfilment stage, a route stage, a user allocation stage, a delivery stage, and a post-delivery stage, a risk profile is determined for the delivery of the item to the delivery location. In particular, at the delivery stage, a computer system determines contextual information including item information associated with the item, delivery location information associated with the delivery location, and user information associated with a user account of the delivery driver. The computer system generates an input to an AI model based on the contextual information and determines a predicted delivery defect for the delivery state based on an output of the AI model, where this defect includes a mis-delivery to a neighbor (MTN). The computer system can determine that the delivery stage is associated with a predicted delivery defect of an MTN because of a location accuracy of the delivery driver's device (e.g., global positioning system (GPS) accuracy). The location accuracy may be included in the contextual information of the delivery stage. Thus, the location accuracy can be considered to be a contributing factor for the predicted MTN delivery defect. Based on the predicted MTN delivery defect and the contributing factor, the computer system can determine a mitigation action of tightening a geofence of the delivery location. The tightened geofence can be output to the delivery driver's device during the delivery stage, so that the delivery driver is notified when their device is within the geofence of the delivery location.

Embodiments of the present disclosure provide various technological advantages over a conventional computer system. For example, the conventional computer system may rely on location information to send a notification to a delivery driver's device about a delivery. However, a delivery defect can occur depending on the accuracy of the location information. When the delivery defect occurs, a workflow may need to be executed in a reactive manner and can include performing time-consuming operations to ensure accuracy of the delivery of the item at the delivery location. Further, the conventional systems may not offer a service that is granular to each delivery stage of a delivery flow, where a particular type(s) of delivery defects is (are)

possible per stage, and where a particular type(s) of mitigation action can be initiated. In comparison, the embodiments overcome the issues that stem from the inaccuracy of the location information. For example, the embodiments provide computing services, which can be implemented in real-time, to proactively trigger mitigation actions for predicted delivery defects. Predicted delivery defects can be robustly determined based on contextual information (rather than only location information) so that the proper mitigation actions can be proactively performed throughout the delivery flow to avoid the predicted delivery defect from occurring. Accordingly, the amount of delivery defects and time involved in a delivery are reduced. As a result, the amount of processing and resources to delivery items and recover incorrectly delivered items are reduced.

FIG. 1 illustrates an example of a system performing delivery defect prediction to trigger a mitigation action during a delivery stage of a delivery flow, according to embodiments of the present disclosure. During the delivery stage, delivery data 112 can be sent to a computer system 130. Although the delivery data 112 is illustrated as being sent from the user device 110, at least of this data 112 can be received by the computer system 130 from other sources. The delivery data 112 includes contextual information associated with the delivery, which may include item information associated with an item 102 being delivered, delivery location information associated with a delivery location 104, and user information associated with a user account. A driver that delivers the item 102 to the delivery location 104 can login to the user account via an application executing on the user device 110. The delivery data 112 may additionally include image data 116A associated with an image of a placement of the item 102 at the delivery location 104. The driver can take the image with the user device 110 during the delivery of the item 102.

The computer system 120 can receive the delivery data 112. The computer system 120 generates an input to an AI model 134 based on the delivery data 112 and contextual information 132. The contextual information 132 can include contextual information associated with the delivery stage and/or previous stages of the delivery flow, such as an order stage, a fulfilment stage, a route stage, and a user allocation stage. Each stage can be associated with different contextual information, which can be stored for use in subsequent stages. So, the input to the AI model 134 can be generated from the delivery data 112 and the contextual information 132.

The AI model 134 generates an output of a predicted delivery defect associated with the delivery stage based on the input. For example, the AI model 134 may determine that the delivery of the item 102 is likely to be associated with a delivered not received (DNR) defect.

The AI model 134 can also determine a contributing factor for the predicted delivery defect. The contributing factor can be associated with the item information (e.g., high-value item in revealing package), the delivery location information, or the user information. For example, based on the image data 116A received by the AI model 134, the AI model 134 can determine that the item 102 is placed outside of a safe delivery window for the delivery location 104, which may result in the item 102 being stolen or a customer associated with the delivery location 104 not being able to locate the item 102, which are both associated with a DNR defect. The predicted delivery defect and the contributing factor can be included a risk profile for the delivery at the delivery stage.

In an example, based on the contributing factor the type of delivery defect, the computer system 130 can determine a mitigation action 114 for the delivery. During the delivery stage, mitigation action data can be sent to the user device 110 indicating the mitigation action 114. For example, the mitigation action 114 may involve presenting an image of an accurate placement for the item 102 at the delivery location 104. The user device 110 can receive image data 116B indicating the correct placement of the item 102. The driver can use the image data 116B to move the item 102 to the correct location, thereby reducing the possibility of the DNR defect for the delivery.

Figure 2:
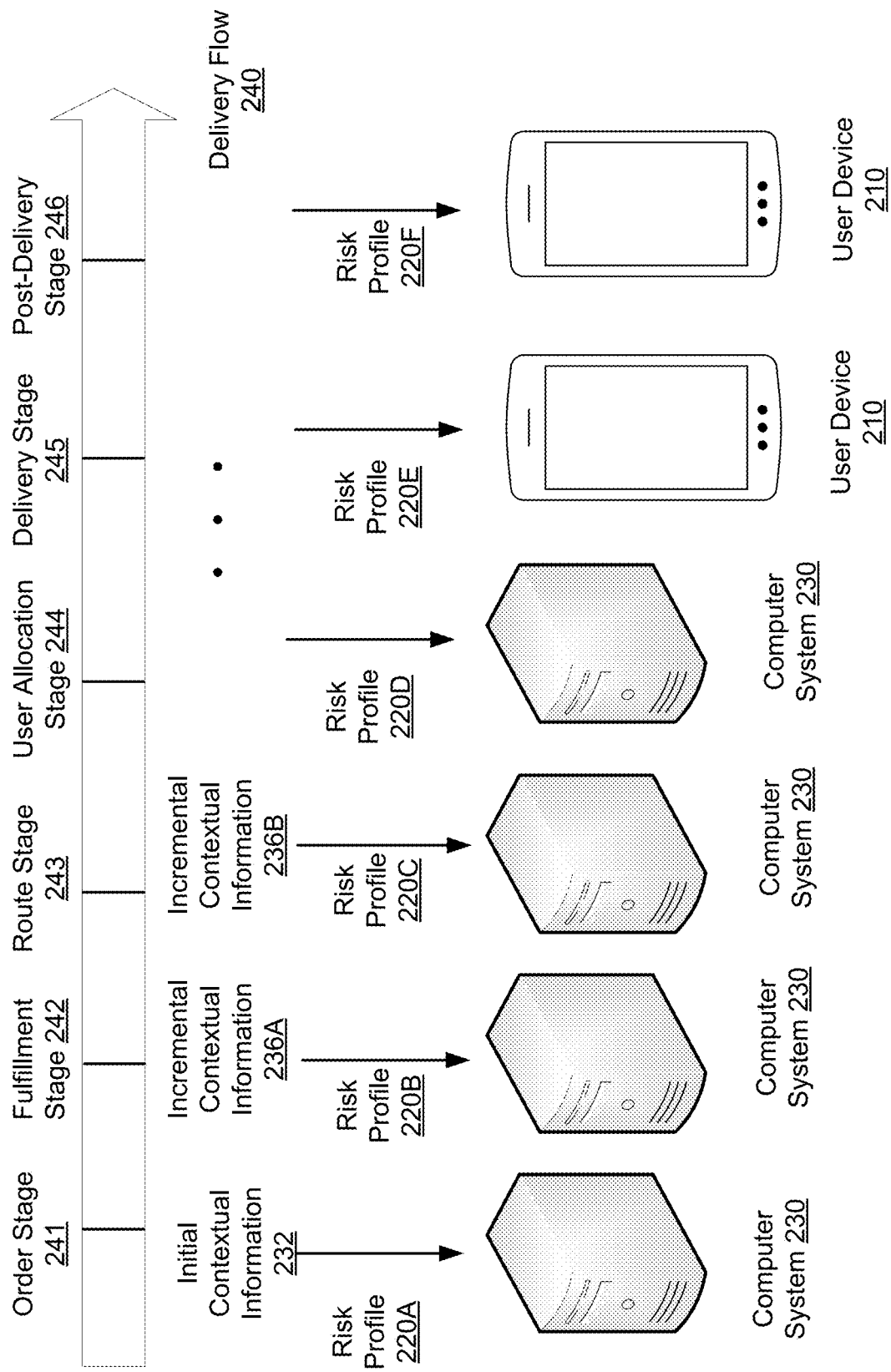
FIG. 2 illustrates an example of stages of risk profile generation during a delivery flow, according to embodiments of the present disclosure.

FIG. 2 illustrates an example of stages of risk profile generation during a delivery flow 240, according to embodiments of the present disclosure. The delivery flow 240 includes various stages, and a risk profile for an item being delivered to a delivery location is generated at each stage. For example, the delivery flow 240 can include an order stage 241 (e.g., a stage at which one or more items are ordered from an online marketplace for a delivery to the delivery location), a fulfilment stage 242 (e.g., a stage at which an ordered item is to be packed from a fulfillment facility and sent to the delivery location), a route stage 243 (e.g., a stage at which multiple items are organized along a delivery route that can be served by a delivery driver), a user allocation stage 244 (e.g., a stage that allocates the delivery route to a user account of the delivery driver), a delivery stage 245 (e.g., a stage at which the delivery driver deliver each of the allocated items to the corresponding delivery location along the delivery route), and a post-delivery stage 246 (e.g., a stage that happens within a time window, such as the next thirty minutes, after each delivery).

Contextual information at each stage can be used to generate risk profiles 220A-F. For example, at the order stage 241, initial contextual information 232 can be used to generate the risk profile 220A. The initial contextual information 232 includes item information associated with the item and delivery location information associated with the delivery location. The item information can include a value of the item, a size of the item, a packaging of the item, etc. The delivery location information can include an address of the delivery location, a preferred delivery placement at the delivery location, etc. The initial contextual information 232 can be input to an AI model, such as AI model 134 in FIG. 1, to generate the risk profile 220A, which can include a type of a predicted delivery defect and a contributing factor for the predicted delivery defect. The risk profiled 220A can be received by a computer system 230 during the order stage 241. The computer system 230 uses the risk profile 220A to determine a mitigation action for reducing a likelihood of the predicted delivery defect occurring for the delivery. For example, the risk profile 220A may indicate that the predicted delivery defect originates from the address of the delivery location. So, the mitigation action can involve allocating the delivery of the item to a user account of an experienced delivery driver during daytime with confirmed attendance at the delivery location.

For the fulfilment stage 242 through the post-delivery stage 246, incremental contextual information can be used, along with the initial contextual information 232, to generate the risk profiles 220B-F (e.g., for a current delivery stage, its contextual information includes information related to the current delivery stage plus the contextual information of the previous delivery stages such that the overall contextual information is accumulated over time). For the fulfilment stage 242, the incremental contextual information 236A can include package information associated with packaging of the item. In the route stage 243, the incremental contextual information 236B can further include route information associated with a route that includes the delivery location. In the user allocation stage 244, the incremental contextual information can further include user information (e.g., performance information, affinity information, and tenure information) associated with a user account to which a delivery of the item is allocated. In the delivery stage 245, the incremental contextual information can further include delivery time information, positioning accuracy information, and environmental information. In the post-delivery stage 246, the incremental contextual information can further include presence information associated with authorized user presence at the delivery location and communication information associated with user communications about a delivery of the item at the delivery location.

The computer system 230 can receive the risk profiles 220B-D, which may each indicate a same or different predicted delivery defect for the item. Each of the risk profiles 220B-D can also indicate one or more contributing factors for the predicted delivery defect. The computer system 230 can use the risk profiles 220B-D to determine a mitigation action for the delivery of the item. The mitigation action can vary depending on each stage by being based on the predicted delivery defect and the contributing factor. For example, at the fulfillment stage 242, the risk profile 220B may indicate that the predicted delivery defect is a DNR defect. Based on the DNR defect, the computer system 230 can determine that the mitigation action involves indicating that the delivery driver is to take a picture during the delivery stage 245 to alert the customer of the item at the delivery location. In contrast, at the user allocation stage 244, the risk profile 220D may indicate that the predicted delivery defect is a MTN defect. Based on the MTN defect, the computer system 230 can determine that the mitigation action involves presenting the delivery driver with information that distinguishes neighboring locations from the delivery location. Although the same computer system 230 is shown as recipient of the risk profiles 220A-220D, a different computer system can be the recipient at each of the stages 241-244.

A user device 210 that is associated with the user account to which the delivery of the item is allocated can receive the risk profiles 220E-F. Similar to the risk profiles 220A-D, each of the risk profiles 220E-F can indicate a predicted delivery defect and one or more contributing factors for the predicted delivery defect. The user device 210 can use the risk profiles 220E-F to determine a mitigation action for the delivery of the item. In some examples, the computer system 230 may receive the risk profiles 220E-F and determine the associated mitigation actions. The computer system 230 may then send the mitigation actions to the user device 210.

Figure 3:
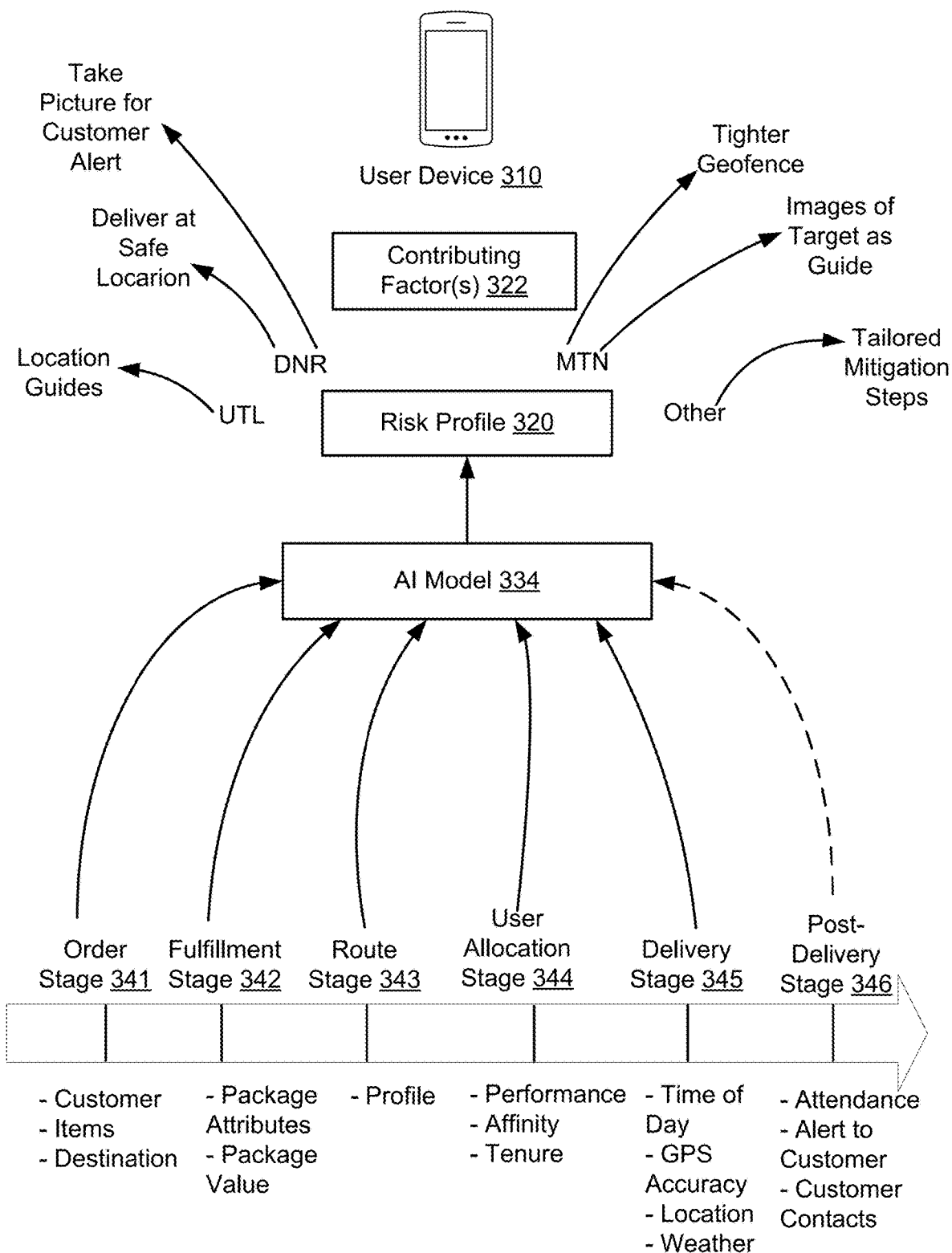
FIG. 3 illustrates an example of a system performing delivery defect prediction to trigger a mitigation action throughout a delivery flow, according to embodiments of the present disclosure.

FIG. 3 illustrates an example of a system performing delivery defect prediction to trigger a mitigation action throughout a delivery flow, according to embodiments of the present disclosure. Initial contextual information is input to an AI model 334 during an order stage 341, and incremental contextual information is input to the AI model 334 at subsequent stages including a fulfilment stage 342, a route stage 343, a user allocation stage 344, a delivery stage 345, and a post-delivery stage 346.

At the order stage 341, the initial contextual information is illustrated as including customer information, item information, and destination information for a delivery of an item to a delivery location. For an item that is associated with a gift order, the customer information can include information about the purchaser of the gift and/or a recipient of the gift.

At the fulfilment stage 342, the incremental contextual information is illustrated as including package attributes and a package value for the item. At the route stage 343, the incremental contextual information is illustrated as including a profile associated with the route (e.g., a number of delivery locations, types of the delivery locations, a difficulty with navigating between the delivery locations, etc.). At the user allocation stage 344, the incremental contextual information is illustrated as including performance information associated with a user, affinity information associated with the user, and tenure information associated with the user. The user can be associated with a user device 310 and can be allocated to fulfill the delivery of the item to the delivery location. At the driver stage 345, the incremental contextual information is illustrated as including environmental information, such as a time of day of the delivery, a GPS accuracy, a location of the delivery, and/or weather conditions associated with the delivery location. At the post-delivery stage 346, the incremental contextual information is illustrated as including attendance of the delivery location, a delivery of an alert to a customer associated with the delivery location, and customer contacts associated with the delivery location. In addition, throughout the delivery flow, special delivery instructions (e.g., from the purchaser and/or recipient) and/or handling instructions (e.g., from a fulfillment center system) may be received as part of the contextual information. As an example, the customer information may indicate a condition of a recipient, and the instructions can describe how to deliver the item given the condition.

At each stage, the AI model 334 receives the associated contextual information and generates a risk profile 320 associated with the delivery of the item to the delivery location. The risk profile 320 includes a likelihood and a type of a predicted delivery defect. For example, for the delivery stage, the types of defects can be a DNR defect, a MTN defect, an unable to locate (UTL) defect, an unable to access (UTA) defect, a first time delivery failure (FTDF) defect, and any other suitable types of delivery defects. Of course, the delivery defect types can be specific to each stage. In an example, the AI model 334 is implemented as a classifier. In this example, the delivery defect types per stage are predefined as possible classifications, and the classifier is trained based on these classifications. The type of delivery defect associated with the risk profile 320 can change based on the contextual information received at each stage. For example, at the order stage 341, the type of predicted delivery defect determined by the AI model 334 may be a UTL defect, but at the fulfilment stage 342, the type of predicted delivery defect determined by the AI model 334 may be a DNR defect.

The AI model 334, or a computer system executing the AI model 334, can determine one or more contributing factor(s) 322 associated with the predicted delivery defect. The contributing factor(s) 322 can be based on the incremental contextual information associated with a stage relative to the contextual information of a previous stage. In particular, if at a current stage of the delivery flow, a particular type of delivery defect is predicted, whereas this delivery defect type was not predicted for the previous stage(s), the incremental contextual information that was used for the current stage can indicate the contributing factor. For example, since the incremental contextual information at the fulfilment stage 342 includes information associated with the package attributes and the package value, which results in the type of predicted delivery defect from a UTL defect to a DNR defect, the AI model 334 can determine that the contributing factor(s) 322 are the package attributes and/or the package value. Additionally or alternatively, because the delivery defect type is predicted by a machine learning model based on the contextual information, machine learning techniques, such as permutation feature importance, can be used to identify the contributing factor(s) from the contextual information that led to the prediction.

Based on the risk profile 320 and the contributing factor(s) 322, the computer system can determine a mitigation action for the delivery of the item to the delivery location. As illustrated, an exemplary mitigation action for a UTL defect is providing location guides to the user device 310 of the user during the delivery of the item. An exemplary mitigation action for a DNR defect can be providing an indication of a safe location to the user device 310 of the user during the delivery of the item. In addition, exemplary mitigation actions for a MTN defect can be generating a tighter geofence for the user device 310 during the delivery of the item or providing an image of a target location at the delivery location to the user device 310. Other delivery defects may additionally be associated with alternate tailored mitigation steps. Generally, each delivery stage and possible delivery defect type at that stage can be pre-associated with a set of mitigation actions that, in turn, are pre-associated with contributing factors. The proper mitigation action to use given the delivery stage and the predicted delivery defect type can depend on the contributing factor. Alternatively or additionally, rather than using pre-associations, an AI model can be trained to output the relevant mitigation action based on the predicted delivery defect and the associated contextual information.

Figure 4:
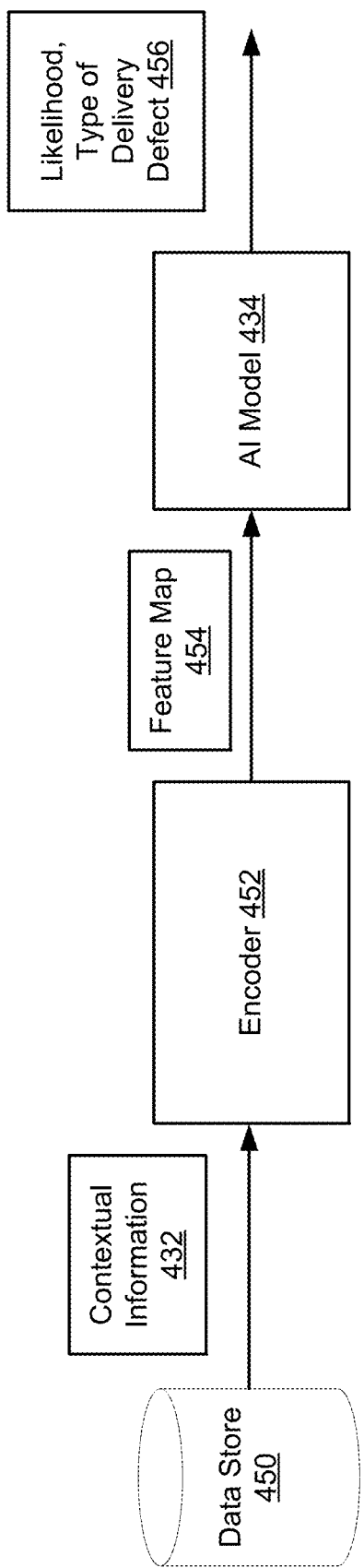
FIG. 4 illustrates an example of an artificial intelligence model predicting a delivery defect, according to embodiments of the present disclosure.

FIG. 4 illustrates an example of an AI model predicting a delivery defect, according to embodiments of the present disclosure. In an example, a data store 450 can store contextual information 432 associated with a delivery of an item to a delivery location. The contextual information 432 can include information associated with one or more stages of a delivery flow of the delivery. An encoder 452 receives the contextual information 432 and applies an embedding function to the contextual information 432 to generate a feature map 454. As an example, at a route stage of the delivery flow, the contextual information 432 can include a first vector for item information associated with the item, a second vector for delivery location information associated with the delivery location, a third vector for package information associated with a packing of the item, and a fourth vector for route information associated with a route that includes the delivery location. The encoder 452 receives the four vectors and generates the feature map 454 by applying the embedding function to the vectors.

In an example, the encoder 452 sends the feature map 454 to an AI model 434 that generates, based on this input, an output of a likelihood and a type of a predicted delivery defect 456. The output the of the AI model 434 can be the likelihood and the type of the predicted delivery defect 456 that corresponds to the highest likelihood of each of the types of delivery defects possible for the stage of the delivery flow. For instance, the AI model 434 may determine that a DNR defect is 2% likely to occur, a FTDA defect is 5% likely to occur, and a UTL defect is 90% likely to occur based on the feature map 454. So, the AI model 434 can output the likelihood and the type of predicted delivery defect 456 indicating the 90% likelihood of the UTL defect.

Figure 5:
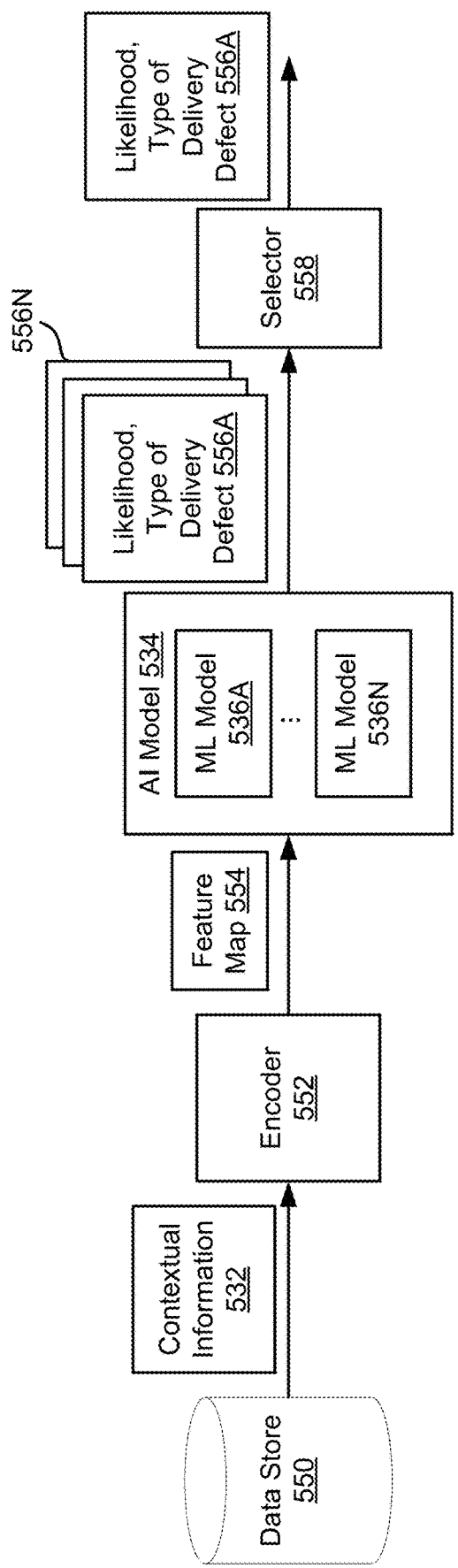
FIG. 5 illustrates another example of an artificial intelligence model predicting a delivery defect, according to embodiments of the present disclosure.

FIG. 5 illustrates another example of an artificial intelligence model predicting a delivery defect, according to embodiments of the present disclosure. In an example, a data store 550 can store contextual information 532 associated with a delivery of an item to a delivery location. The contextual information 532 can include information associated with one or more stages of a delivery flow of the delivery. An encoder 552 receives the contextual information 532 and applies an embedding function to the contextual information 532 to generate a feature map 554.

In an example, the encoder 552 sends the feature map 554 to an AI model 534 that includes multiple machine learning (ML) models 536A-N. For example, the AI model 534 may include an ML model trained for each type of delivery defect for the stage of the delivery flow. That is, ML model 536A can be trained for a first delivery defect (e.g., UTL) and ML model 536B can be trained for a second delivery defect (e.g., MTN). The AI model 534 can input the feature map 554 to each of the ML models 536A-N. Each of the ML models 536A-N can determine a likelihood for the type of delivery defect based on the feature map 554. For instance, the ML model 536A may determine that a UTL defect is 62% likely to occur and the ML model 536B may determine that a MTN defect is 5% likely to occur based on the feature map 554. The AI model 534 can output each of the determined likelihoods and the types of the predicted delivery defects 556A-N.

A selector 558 receives the likelihoods and the types of the predicted delivery defects 556A-N from the AI model 534. The selector 558 can compare each of the received likelihoods to determine which of the likelihoods is highest. Based on the comparison, the selector 558 selects a likelihood and type of delivery defect for the item. For example, the selector 558 can compare the 62% likelihood for the UTL defect to the 5% likelihood for the MTN defect. So, the selector 558 can output the likelihood and the type of predicted defect 556A indicating the 62% likelihood of the MTN defect. Alternatively, rather than selecting the defect that has the highest likelihood, the selector 558 can compare the likelihoods to a likelihood threshold (e.g., 70%) and select one or more defects given the comparison. The defect(s) selected can have likelihood(s) larger than a pre-defined likelihood threshold. The likelihood threshold can vary depending on the stages of the delivery flow.

Training the AI model 534 of FIG. 5 or the AI model 434 of FIG. 4 can be based on historical delivery information that is associated with a various delivery locations. For a past delivery the historical delivery information can include corresponding contextual information associated with delivery stages of the past delivery, and customer feedback data indicating whether the past delivery is associated with a type of delivery defect. There may be a feedback time window (e.g., 45 days) during which feedback indicating a delivery defect for the past delivery is received. For example, a customer can order an item from an online marketplace. The customer order received from a computing device of the user or a supposed delivery of the item determined based on delivery information from a computing device of a delivery driver can trigger the start of the feedback time window. During that window, the customer can indicate, via feedback from their computing device to the online marketplace about the delivery of the item purchased, whether a UTL, MTN, or any other delivery defect occurred. If no feedback information is received, the delivery is assumed to be defect-free. As such, historical delivery information can be collected and can be associated (e.g., via labels used subsequently in the training) with the types of delivery defects or with successful deliveries. Some feedback information can be immediately available, other information may be available at different times of the feedback time window, and other information can be available at the end of the feedback time window. The historical delivery information is used as training data by the AI model 534 to minimize a loss function associated with predicting delivery defect information.

Figure 6:
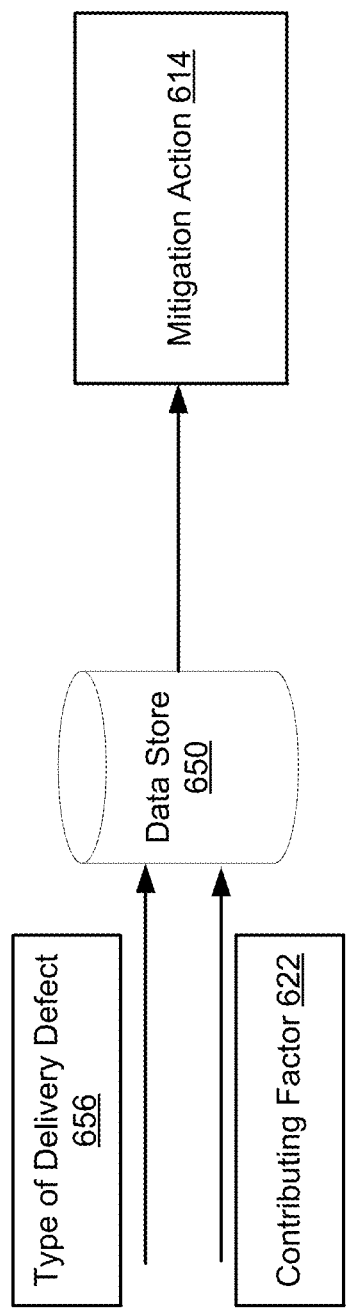
FIG. 6 illustrates an example of a system determining a mitigation action, according to embodiments of the present disclosure.

FIG. 6 illustrates an example of a system determining a mitigation action 614, according to embodiments of the present disclosure. To determine the mitigation action 614, a computer system, such as computer system 130 in FIG. 1, may query a data store 650 based on a contributing factor 622 and a type of the predicted delivery defect 656. The contributing factor 622 and the type of the predicted delivery defect 656 can be previously determined based on an AI model of the computer system. The data store 650 can store, for each stage of a delivery flow, associations between mitigation actions, contributing factors, and delivery defect types. So, based on the type of the predicted delivery defect 656 and the contributing factor 622, the data store 650 can output the mitigation action 614 for the stage. The computer system receives the mitigation action 614 and causes an occurrence of the mitigation action during the stage of the delivery flow.

Figure 7:
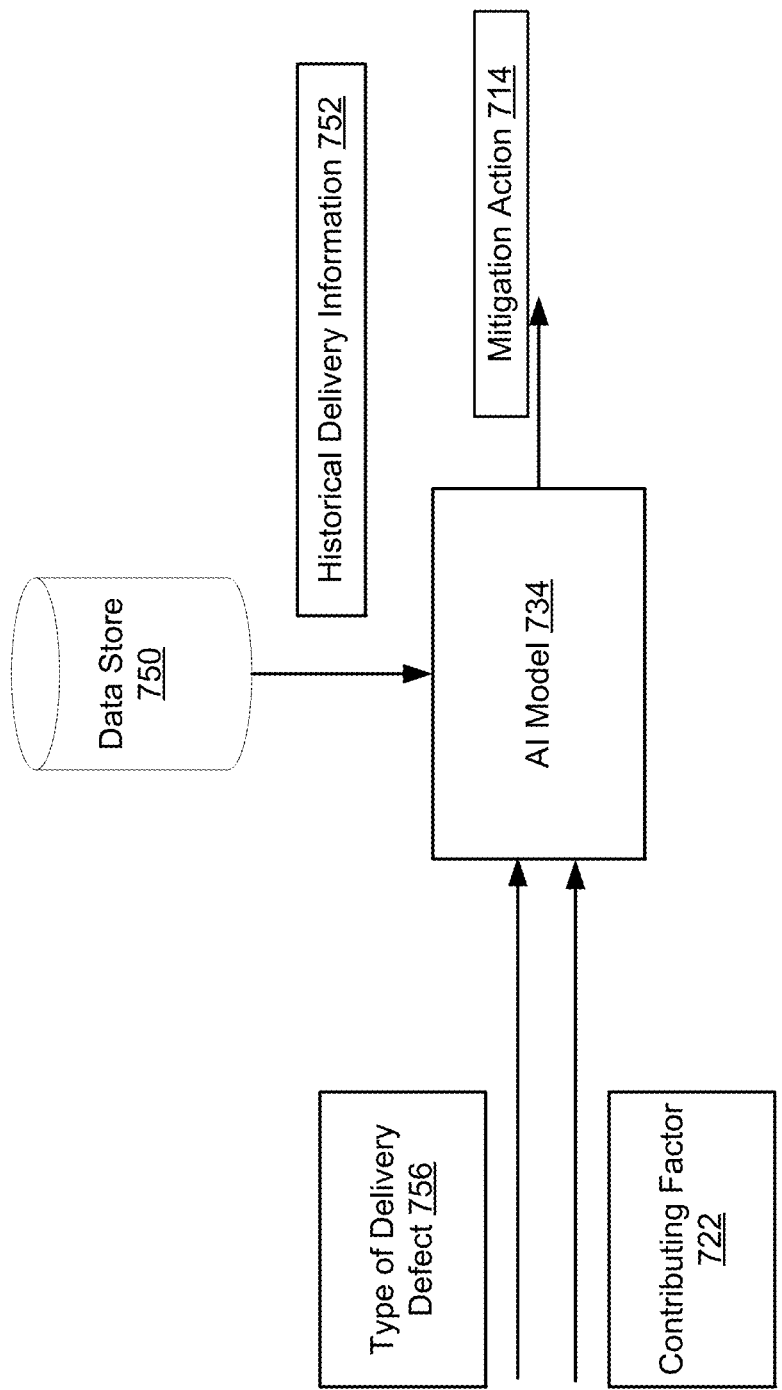
FIG. 7 illustrates another example of a system determining a mitigation action, according to embodiments of the present disclosure.

FIG. 7 illustrates another example of a system determining a mitigation action 714, according to embodiments of the present disclosure. To determine the mitigation action 714, a computer system, such as computer system 130 in FIG. 1, may input a contributing factor 722, a type of the predicted delivery defect 756, and historical delivery information 752 associated with a delivery location to an AI model 734. The historical delivery information 752 can include timings of previous item deliveries to the delivery location, indications of delivery defects associated with previous item deliveries to the delivery location, and other information about previous item deliveries to the delivery location.

The AI model 734 can be a different AI model than the AI model used to determine the type of the predicted delivery defect 756 and the contributing factor 722. The AI model 734 can be trained to generate mitigation actions. So, based on the contributing factor 722, the type of the predicted delivery defect 756, and the historical delivery information 752, the AI model 734 can output the mitigation action 714. The computer system can either implement the mitigation action 714 or send mitigation action data associated with the mitigation action 714 to a user device associated with the delivery of item.

Figure 8:
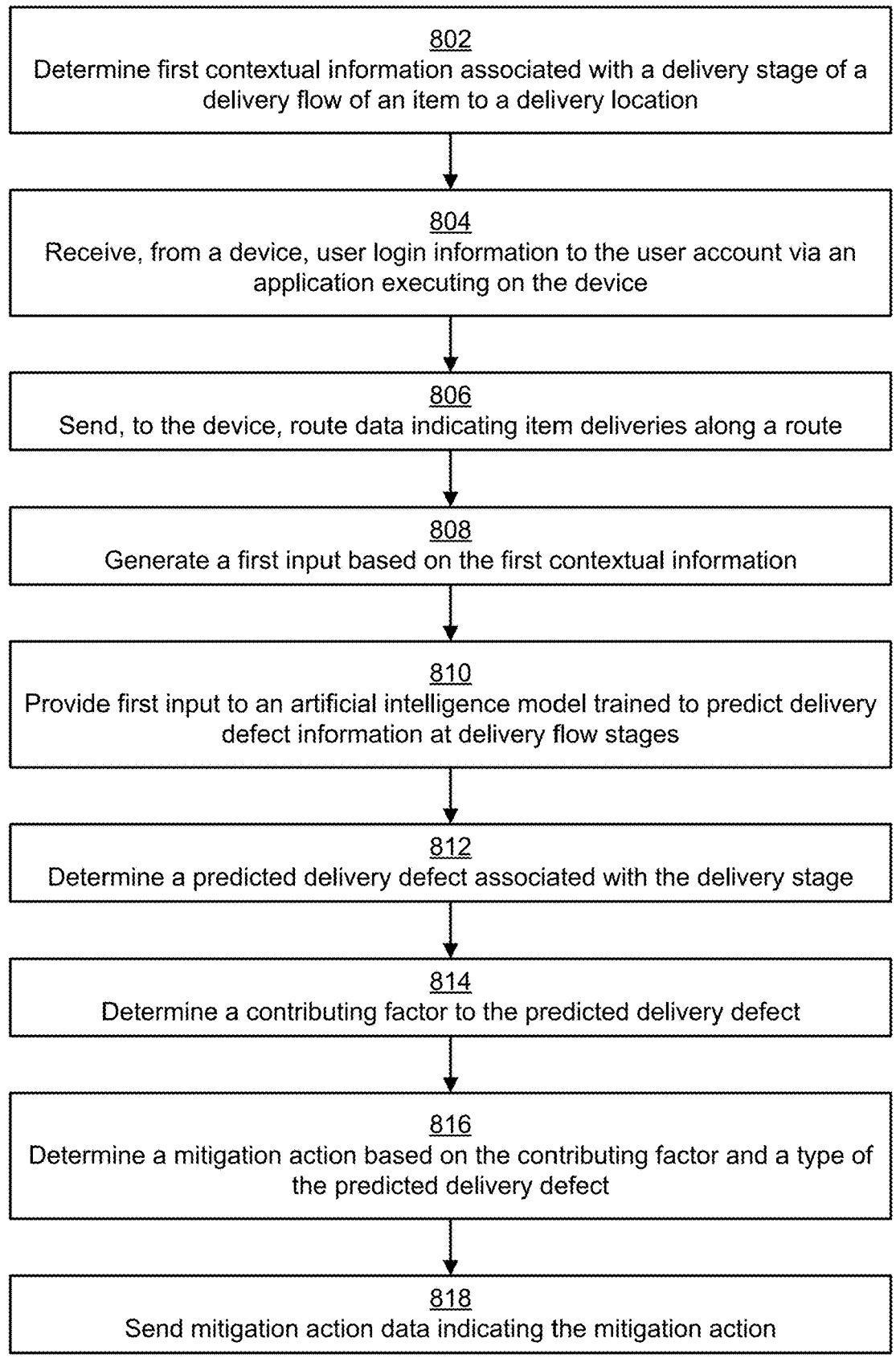
FIG. 8 illustrates an example of a flow for a system triggering a mitigation action based on an artificial intelligence model-based delivery defect prediction according to embodiments of the present disclosure.
Figure 9:
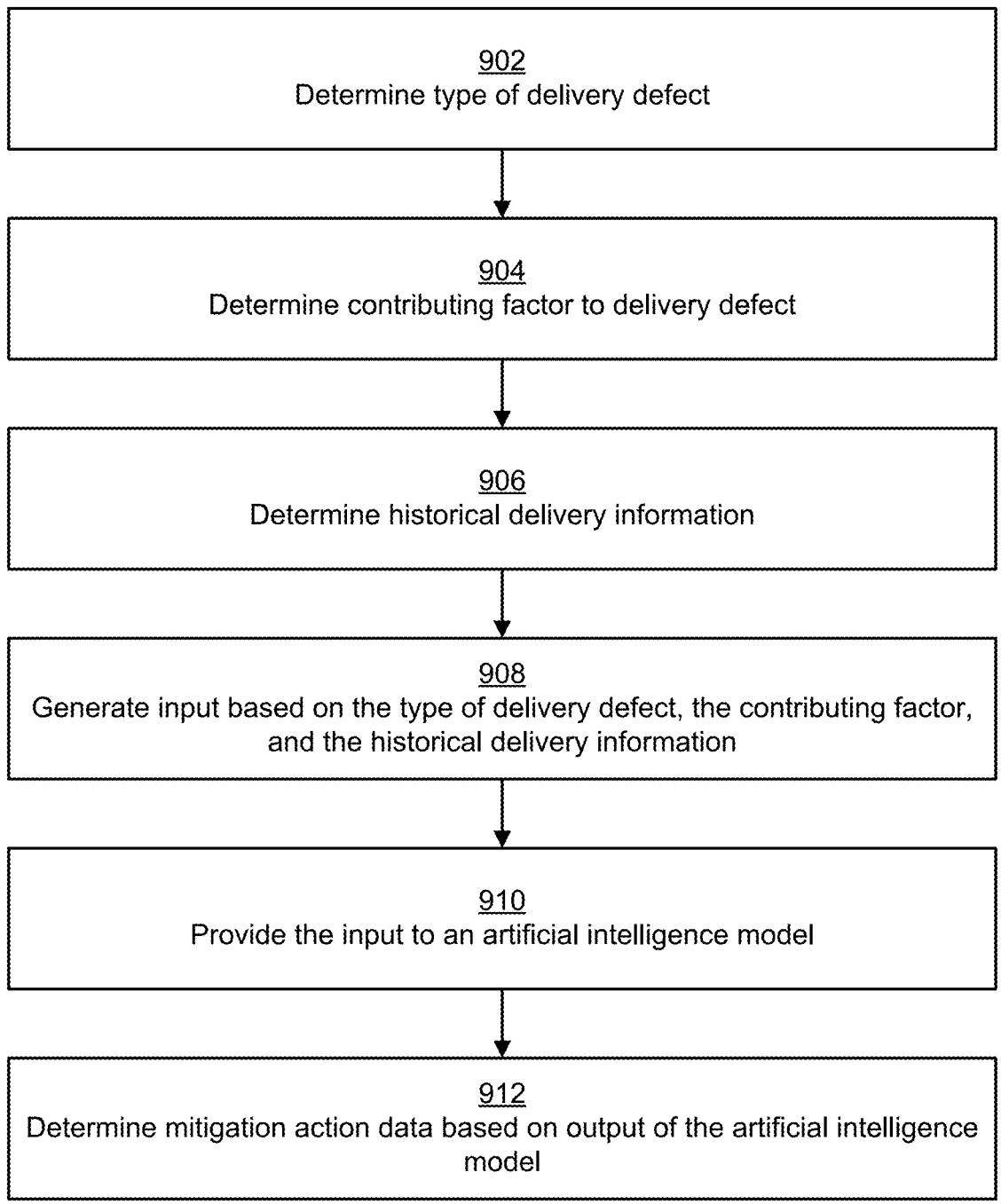
FIG. 9 illustrates an example of a flow for using an artificial intelligence model to generate a mitigation action, according to embodiments of the present disclosure.

FIGS. 8 and 9 illustrate examples of flows for performing mitigation actions for item deliveries based on predicted delivery defects, according to embodiments of the present disclosure. Some or all of the instructions for performing the operations can be implemented as hardware circuitry and/or stored as computer-readable instructions on a non-transitory computer-readable medium of a computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow for a system triggering a mitigation action based on an artificial intelligence model-based delivery defect prediction according to embodiments of the present disclosure. In an example, the flow includes operation 802, where the computer system determines first contextual information associated with a delivery stage of a delivery flow of an item to a delivery location. The first contextual information can include item information associated with the item, delivery location information associated with the delivery location, and environmental information associated with the delivery location. Other stages of the delivery flow can be associated with different contextual information than the first contextual information.

In an example, the flow includes operation 804, where the computer system receives, from a device, user login information to the user account via an application executing on the device. The device can be a user device associated with a driver that performs item deliveries.

In an example, the flow includes operation 806, where the computer system sends, to the device, route data indicating item deliveries along a route. The route can include the delivery location. The device receiving the route data can indicate that the driver was previously allocated to deliver the item to the delivery location.

In an example, the flow includes operation 808, where the computer system generates a first input based on the first contextual information. The first input can be a feature map generated from the first contextual information. For example, an encoder may receive the first contextual information, apply an embedding function, and generate the feature map.

In an example, the flow includes operation 810, where the computer system provides the first input to an AI model trained to predict delivery defect information at delivery flow stages. The AI model may be the AI model 434 in FIG. 4 or the AI model 534 in FIG. 5. So, the AI model may include one or more machine learning models for determining a likelihood of a type of delivery defect.

In an example, the flow includes operation 812, where the computer system determines a predicted delivery defect associated with the delivery stage. The predicted delivery defect is determined based on a first output of the AI model. The AI model may output an indication of the type of delivery defect and the likelihood for the type of delivery defect associated with a highest likelihood. Alternatively, the AI model may output an indication of each type of delivery defect and their associated likelihood. The computer system can compare the likelihoods to determine which is the highest.

In an example, the flow includes operation 814, where the computer system determines a contributing factor to the predicted delivery defect. The contributing factor is associated with associated with at least one of the item information, the delivery location information, or the environmental information. For example, if the predicted delivery defect is a damaged item, the computer system may determine that the contributing factor is the weather based on the environmental information indicating that weather conditions are expected to be rainy at the delivery location during the expected delivery period.

In an example, the flow includes operation 816, where the computer system determines a mitigation action based on the contributing factor and a type of the predicted delivery defect. For example, if the predicted delivery defect is a damaged item and the contributing factor is the weather, the mitigation action may involve delivering the item to a covered location at the delivery location or postponing the delivery until the rain is expected to no longer affect the delivery location.

In an example, the flow includes operation 818, where the computer system sends mitigation action data indicating the mitigation action. The device of the driver can receive the mitigation action data and display the mitigation action to the driver. So, the driver can receive instructions to postpone the delivery of the item or may receive an indication of a covered location at the delivery location where the item should be placed.

FIG. 9 illustrates an example of a flow for using an artificial intelligence model to generate a mitigation action, according to embodiments of the present disclosure. In an example, the flow includes operation 902, where the computer system determines a type of delivery defect. The computer system can input contextual data associated with a stage of a delivery flow to an AI model that is trained to predict delivery defect information. The AI model can output the type of the predicted delivery defect.

In an example, the flow includes operation 904, where the computer system determines a contributing factor to the delivery defect. The contributing factor is associated with associated with at some of the contextual information for the stage of the delivery flow. For example, the computer system can determine an incremental change to the contextual information relative to a previous stage of the delivery flow. Based on the incremental change, the computer system determines the contributing factor to the predicted delivery defect.

In an example, the flow includes operation 906, where the computer system determines historical delivery information. The historical delivery information can include timings of previous item deliveries to the delivery location, indications of delivery defects associated with previous item deliveries to the delivery location, and other information about previous item deliveries to the delivery location. The computer system can access a data store that stores the historical delivery information to determine the historical delivery information.

In an example, the flow includes operation 908, where the computer system generates input based on the type of the delivery defect, the contributing factor, and the historical delivery information. The input can be a vector that includes the type of the delivery defect, the contributing factor, and the historical delivery information.

In an example, the flow includes operation 910, where the computer system provides the input to an AI model. The AI model is trained to generate mitigation actions. For example, the AI model may be AI model 734 in FIG. 7.

In an example, the flow includes operation 912, where the computer system determines mitigation action data based on an output of the AI model. Based on an output of the AI model, the computer system can determine the mitigation action data. For example, the output of the AI model may be a ranking of mitigation actions and the computer system can determine the mitigation action data corresponds to a highest ranking mitigation action.

Figure 10:
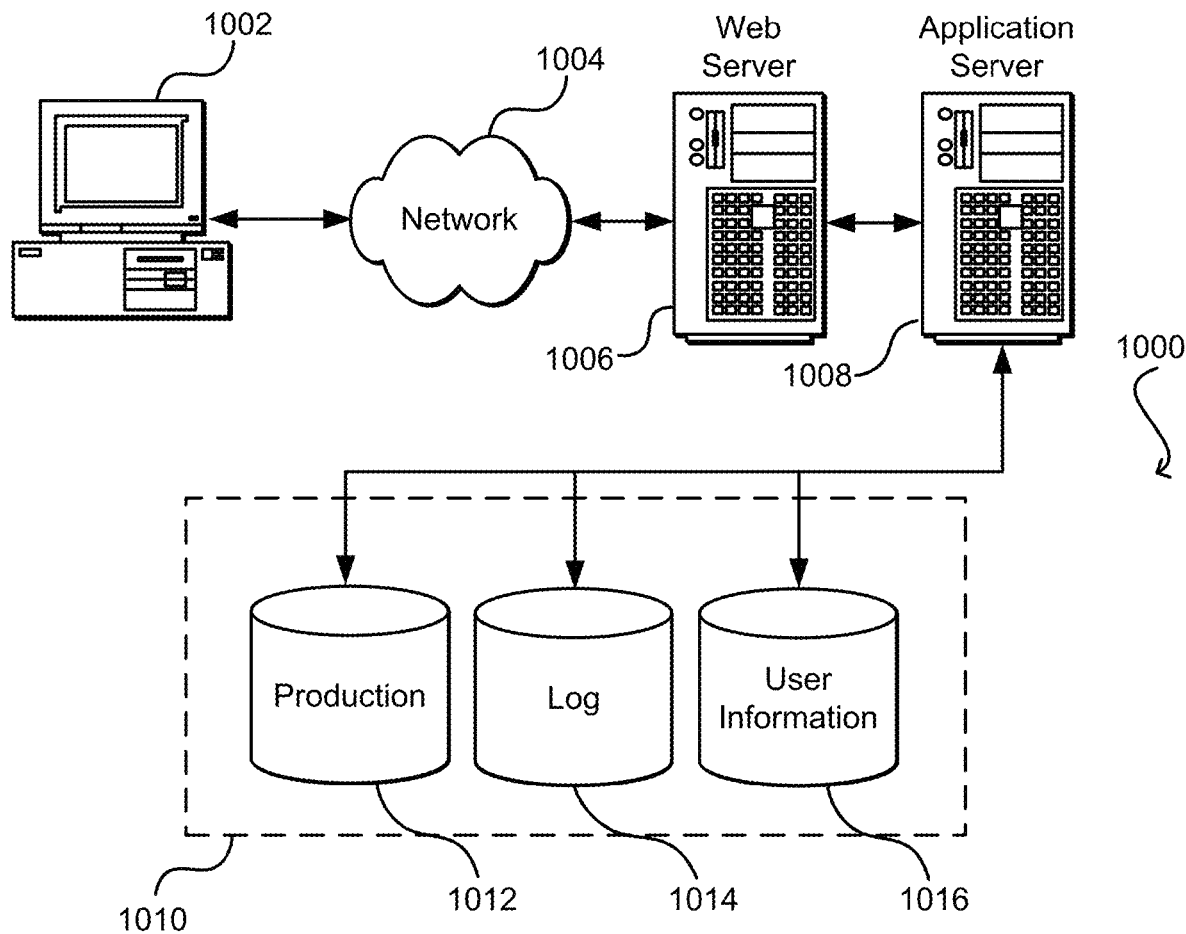
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002 (such as any of the multimedia devices described herein above), which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memory storing computer-readable instructions that, upon execution by the one or more processors, configure the system to:
  determine first contextual information associated with a first delivery stage of a delivery flow of an item to a delivery location, the delivery flow including the first delivery stage and a second delivery stage, the delivery flow to be performed at least in part by using a device in associated the first delivery stage, the first contextual information comprising item information associated with the item, delivery location information associated with the delivery location, environmental information associated with the delivery location, and a positioning accuracy of the device;
  receive, from the device, user login information to a user account via an application executing on the device;
  send, to the device, route data indicating item deliveries along a route and causing the application to present the route on a user interface of the device, the route comprising the delivery location;
  generate a first input based at least in part on the first contextual information;
  provide the first input to an artificial intelligence model system trained to predict delivery defect information at delivery flow stages, the artificial intelligence model system comprising a plurality of machine learning models,
  wherein the first input is provided to a first machine learning model and a second machine learning model of the plurality of machine learning models, wherein the first machine learning model is trained for a first delivery defect type, and wherein the second machine learning model is trained for a second delivery defect type;
  receive a first output of the first machine learning model, wherein the first output indicates a first likelihood of the first delivery defect type;
  compare the first likelihood with at least one of: (i) a second likelihood included in a second output generated by the second machine learning model and associated with the second delivery defect type or (ii) with a likelihood threshold;
  select the first output based at least in part on the comparing, wherein a predicted delivery defect has the first likelihood and is of the first delivery defect type;
  determine a contributing factor to the predicted delivery defect, the contributing factor associated with at least one of the item information, the delivery location information, the environmental information, or the positioning accuracy of the device;
  determine a mitigation action based at least in part on the contributing factor and a type of the predicted delivery defect;
  adjust a geofence of the delivery location based at least in part on the mitigation action; and send, to the device during the first delivery stage, mitigation action data indicating the mitigation action when the device is detected to be within the adjusted geofence.

2. The system of claim 1, wherein the one or more memory storing computer-readable instructions that, upon execution by the one or more processors, further configure the system to:
   determine second contextual information associated with the second delivery stage of the delivery flow;
   generate a second input based at least in part on the second contextual information;
   provide the second input to the artificial intelligence model system; and
   determine, based at least in part on a third output of the artificial intelligence model system, a different predicted delivery defect associated with the second delivery stage.

3. The system of claim 1, wherein the mitigation action is determined by at least:
   querying a data store based at least in part on the contributing factor and the type of the predicted delivery defect, wherein the data store stores associations between mitigation actions, contributing factors, and delivery defect types; and
   receiving, from the data store, the mitigation action data.

4. The system of claim 1, wherein the mitigation action is determined by at least:
   generating a third input based at least in part on the contributing factor, the type of the predicted delivery defect, and historical delivery information associated with the delivery location;
   providing the third input to a machine learning model trained to generate mitigation actions; and
   determining, based at least in part on a third output of the machine learning model, the mitigation action data.

5. A computer-implemented method comprising:
   determining contextual information associated with a stage of a delivery flow of an item to a delivery location, wherein the contextual information includes a positioning accuracy of a device;
   generating a first input based at least in part on the contextual information;
   providing the first input to an artificial intelligence model system trained to predict delivery defect information at delivery flow stages, the artificial intelligence model system comprising a plurality of machine learning models,
   wherein the first input is provided to a first machine learning model and a second machine learning model of the plurality of machine learning models, wherein the first machine learning model is trained for a first delivery defect type, and wherein the second machine learning model is trained for a second delivery defect type;
   receiving a first output of the first machine learning model, wherein the first output indicates a first likelihood of the first delivery defect type;
   comparing the first likelihood with at least one of: (i) a second likelihood included in a second output generated by the second machine learning model and associated with the second delivery defect type or (ii) with a likelihood threshold;
   selecting the first output based at least in part on the comparing, wherein a predicted delivery defect has the first likelihood and is of the first delivery defect type;
   determining a mitigation action based at least in part on the predicted delivery defect and the contextual information;
   adjusting a geofence of the delivery location based at least in part on the mitigation action; and
   sending mitigation action data indicating the mitigation action to the device when the device is detected to be within the adjusted geofence.

6. The computer-implemented method of claim 5, wherein the stage is a delivery stage, wherein the contextual information comprises item information associated with the item, delivery location information associated with the delivery location, and user information associated with a user account, and wherein the computer-implemented method further comprises:
   receiving, from a device, user login information to the user account via an application executing on the device;
   sending, to the device, route data indicating item deliveries along a route, the route comprising the delivery location;
   determining a contributing factor to the predicted delivery defect, the contributing factor associated with at least one of the item information, the delivery location information, or the user information, wherein the mitigation action is determined further based at least in part on the contributing factor and a type of the predicted delivery defect; and
   sending, to the device during the delivery stage, mitigation action data indicating the mitigation action.

7. The computer-implemented method of claim 5, further comprising:
   determining a likelihood and a type of the predicted delivery defect, wherein the likelihood and the type are indicated by the output of the artificial intelligence model.

8. The computer-implemented method of claim 5, wherein the artificial intelligence model is trained based at least in part on historical delivery information that is associated with a plurality of delivery locations and that includes, for a past delivery, (i) corresponding contextual information associated with delivery stages of the past delivery, and (ii) feedback data indicating whether the past delivery is associated with a type of delivery defect.

9. The computer-implemented method of claim 5, wherein the contextual information changes based at least in part on stages of the delivery flow, and wherein computer-implemented method further comprises:
   receiving the contextual information based at least in part on a change to the contextual information, wherein the first input is generated based at least in part on the change.

10. The computer-implemented method of claim 5, wherein the contextual information changes incrementally between stages of the delivery flow, and wherein computer-implemented method further comprises:
    receiving an incremental change to the contextual information, wherein the first input is generated based at least in part on the incremental change.

11. The computer-implemented method of claim 10, wherein the stage is associated with the incremental change relative to a previous stage of the delivery flow, and wherein the computer-implemented method further comprises:
    determining, based at least in part on the incremental change, a contributing factor to the predicted delivery defect, wherein the mitigation action is determined further based at least in part on the contributing factor.

12. One or more non-transitory computer-readable storage media storing instructions that, upon execution on a system, cause the system to perform operations comprising:
determining contextual information associated with a stage of a delivery flow of an item to a delivery location, wherein the contextual information includes a positioning accuracy of a device;
generating a first input based at least in part on the contextual information;
providing the first input to an artificial intelligence model system trained to predict delivery defect information at delivery flow stages, the artificial intelligence model system comprising a plurality of machine learning models,
wherein the first input is provided to a first machine learning model and a second machine learning model of the plurality of machine learning models, wherein the first machine learning model is trained for a first delivery defect type, and wherein the second machine learning model is trained for a second delivery defect type;
receiving a first output of the first machine learning model, wherein the first output indicates a first likelihood of the first delivery defect type;
comparing the first likelihood with at least one of: (i) a second likelihood included in a second output generated by the second machine learning model and associated with the second delivery defect type or (ii) with a likelihood threshold;
selecting the first output based at least in part on the comparing, wherein the predicted delivery defect has the first likelihood and is of the first delivery defect type;
determining a mitigation action based at least in part on the predicted delivery defect and the contextual information;
adjusting a geofence of the delivery location based at least in part on the mitigation action; and
sending mitigation action data indicating the mitigation action to the device when the device is detected to be within the adjusted geofence.

13. The one or more non-transitory computer-readable storage media of claim 12, wherein the stage corresponds to an order stage, and wherein the contextual information comprises item information associated with the item, customer information associated with the delivery location, and delivery location information associated with the delivery location.

14. The one or more non-transitory computer-readable storage media of claim 12, wherein the stage corresponds to a packaging stage, and wherein the contextual information comprises package information associated with packaging of the item.

15. The one or more non-transitory computer-readable storage media of claim 12, wherein the stage corresponds to a routing stage, and wherein the contextual information comprises route information associated with a route that includes the delivery location.

16. The one or more non-transitory computer-readable storage media of claim 12, wherein the stage corresponds to a user allocation stage, and wherein the contextual information comprises user information associated with a user account to which at a delivery of the item is allocated.

17. The one or more non-transitory computer-readable storage media of claim 12, wherein the stage corresponds to a delivery stage, and wherein the contextual information comprises environmental information associated with the delivery location, the environmental information including at least one of delivery time information, positioning accuracy information, or weather information.

18. The one or more non-transitory computer-readable storage media of claim 12, wherein the stage corresponds to a post-delivery stage, and wherein the contextual information comprises presence information associated with authorized user presence at the delivery location and communication information associated with user communications about a delivery of the item at the delivery location.

19. The one or more non-transitory computer-readable storage media of claim 12, wherein the artificial intelligence model system is updated by at least:
receiving, from a user device, feedback data indicating whether the predicted delivery defect was mitigated or not upon the item being delivered to the delivery location;
generating a label based at least in part on the feedback data;
including the label and the feedback data in training data; and
updating the artificial intelligence model system based at least in part on the training data.

20. The system of claim 1, wherein the first delivery stage is a driver stage and the second delivery stage is a user allocation stage;
wherein each stage is associated with different contextual information;
wherein the first contextual information associated with the first delivery stage comprises location sensor data; and
wherein second contextual information associated the second delivery stage comprises image data associated with an image of a placement of the item at the delivery location.

* * * * *